United States Patent [19]

Carbonell et al.

[11] 4,199,813
[45] Apr. 22, 1980

[54] APPARATUS USEFUL IN EXHAUST DYEING

[75] Inventors: Jose Carbonell, Bottmingen; Rolf Hasler, Therwil, both of Switzerland; Roland Walliser, Rixheim, France

[73] Assignee: Sandoz Ltd., Basel, Switzerland

[21] Appl. No.: 904,997

[22] Filed: May 11, 1978

Related U.S. Application Data

[62] Division of Ser. No. 423,311, Dec. 10, 1973, Pat. No. 4,089,644.

[51] Int. Cl.² .............................................. G05B 21/00
[52] U.S. Cl. ..................................... 364/469; 364/107; 364/496
[58] Field of Search ............... 364/469, 107, 476, 510, 364/496, 500, 502

[56] References Cited

U.S. PATENT DOCUMENTS

| | | | |
|---|---|---|---|
| 3,070,302 | 12/1962 | Fuegel et al. | 364/496 X |
| 3,777,127 | 12/1973 | Goetchius et al. | 364/497 |
| 3,781,533 | 12/1973 | Barnstone et al. | 364/500 X |
| 3,985,712 | 12/1976 | Garst | 364/107 X |
| 4,102,492 | 7/1978 | Gold et al. | 364/468 X |

*Primary Examiner*—Edward J. Wise
*Attorney, Agent, or Firm*—Gerald D. Sharkin; Richard E. Vila; Thomas C. Doyle

[57] ABSTRACT

The present invention relates to a novel exhaust-dyeing process to obtain level dyeings which is characterized by the step of regulating the parameters that affect the rate of adsorption of the dye onto the substrate in order to prevent the rate of bath exhaustion as a function of the number of cycles of dye liquor and/or substrate from exceeding a predetermined limit. The invention also relates to an apparatus for effecting said process.

8 Claims, 13 Drawing Figures

FIG. I

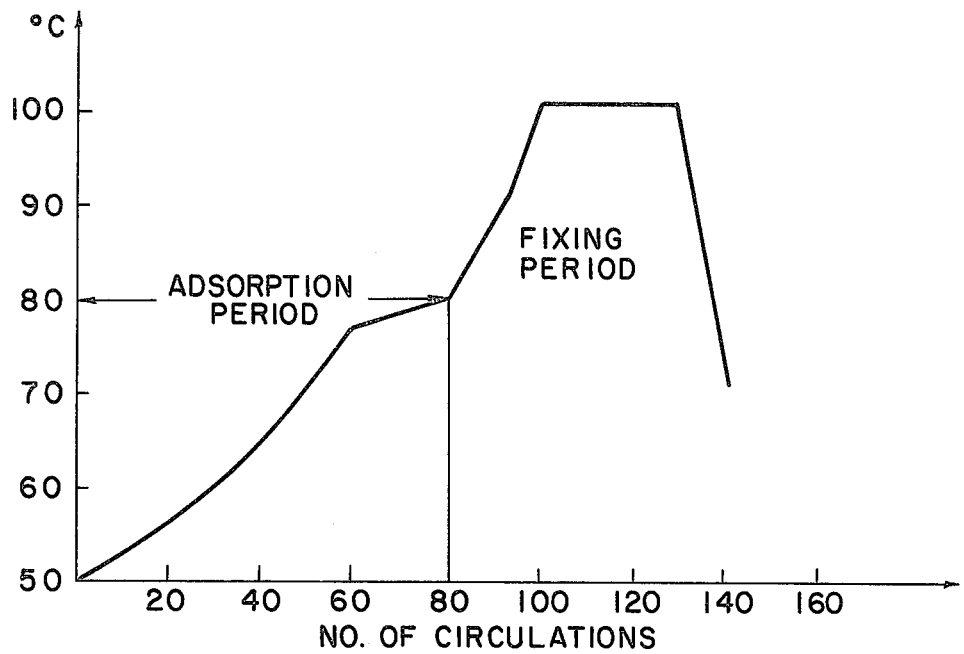
FIG. 9
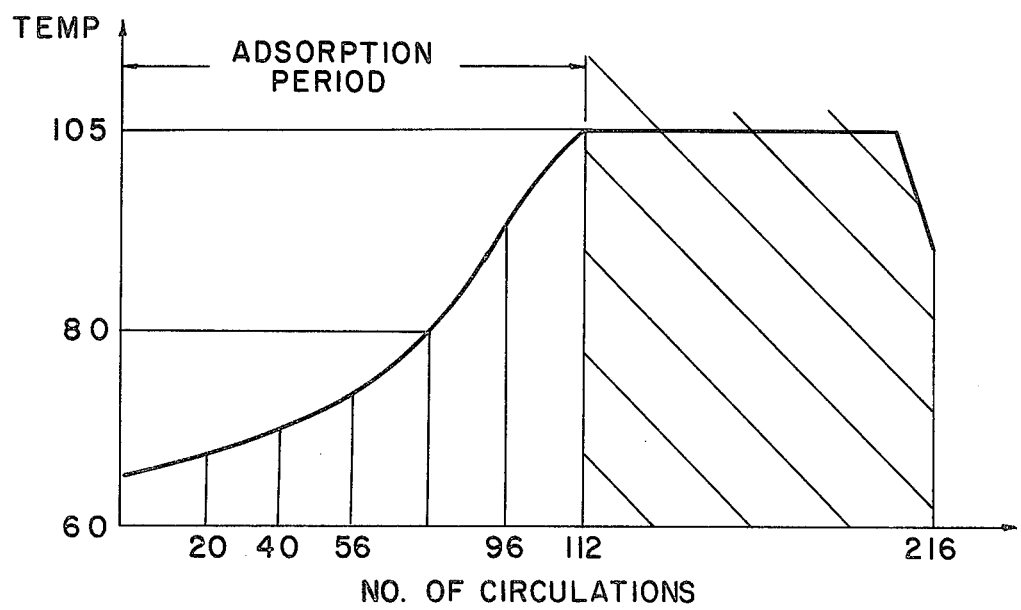
NO. 10

APPARATUS USEFUL IN EXHAUST DYEING

This is a division of application Ser. No. 423,311 filed Dec. 10, 1973 now U.S. Pat. No. 4,089,644.

The present invention relates to dyeing processes and more specifically to exhaust-dyeing processes.

It is to be understood that by "exhaust-dyeing processes", is meant processes wherein a substrate is immersed in a dye liquor, and the dye liquor is caused relatively to flow past the substrate by movement of the dye liquor and/or by movement of the substrate with a view to transfering a substantial amount of dye from the dye liquor to the substrate.

A particular difficulty hitherto experienced with the transfer of a dye from a dye liquor to a substrate in exhaust dyeing processes is the uneven buildup of dye on the substrate, leading to what is known as "unlevel" dyeings, particularly in automatic dyeing or other dyeing processes effected in the absence of supervision by an expert operator. It is known, however, that the difficulty of unlevel dyeings is associated with irregular adsorption of the dye on the substrate and is caused, at least in part, by the steady depletion of dye in the dye liquor and, indeed, attempts have been made to achieve regular or constant adsorption, for example, by varying temperature as a linear function of dyeing time.

Nevertheless, difficulties in level dyeing have generally arisen, because, hitherto, there has been no reliable method of measuring the rate of adsorption of dye onto the substrate.

Accordingly, the present invention provides a process of exhaust dyeing a substrate to obtain a level dyeing which comprises regulating at least one of the parameters of the dye bath that control dye adsorption onto the substrate to maintain the rate of bath exhaustion as a function of the number of cycles of dye liquor and/or substrate below a limiting value throughout the complete dyeing process.

More specifically, the present invention provides a process of exhaust dyeing a substrate to obtain a level dyeing which comprises monitoring, directly or indirectly, the rate of bath exhaustion as a function of the number of cycles of dye liquor and/or substrate and regulating at least one of the parameters of the dye bath that control dye adsorption onto the substrate to maintain said monitored rate below a limiting value throughout the complete dyeing process.

The present invention also provides an apparatus for exhaust dyeing a substrate to obtain a level dyeing which comprises a dye bath, monitor means for monitoring, directly or indirectly, the rate of bath exhaustion as a function of the number of cycles of dye liquor and/or substrate and regulator means for regulating at least one of the parameters of the dye bath that control dye adsorption onto the substrate to maintain the rate of bath exhaustion as a function of the number of cycles of dye liquor and/or substrate below a limiting value.

In a first form of the apparatus of the invention, the monitor means is indirect and comprises a subsidary monitor means for monitoring the number of cycles of dye liquor and/or substrate as a function of time, and a data processing unit with an input from the subsidiary monitor means and an output to the regulator means, programmed to anticipate the rate of bath exhaustion as a function of the number of cycles of dye liquor and/or substrate per unit change in the directly monitored number of cycles of dye liquor and/or substrate, with time, the data processing unit also comprising a control means to regulate the regulator means in accordance with said anticipated change.

In a second form of the apparatus of the invention, the monitor means is a direct monitor means, i.e. capable of directly monitoring the actual rate of bath exhaustion as a function of the number of cycles of dye liquor and/or substrate. Preferably the apparatus further comprises a control means in the form of a data processing unit with an input from the direct monitor means and an output to the regulator means, said data processing unit having a programme to control the regulator means on the basis of the monitored rate.

As employed herein, the term "bath exhaustion" means the degree of depletion in concentration of the dye component in the dye liquor, the term "cycle" in respect to the dye liquor means the circulation of the complete volume of the dye liquor in the bath and in respect of the substrate means one complete cyclic movement, e.g. immersion, with respect to a reference point, of the substrate in the dye liquor. The number of cycles of dye liquor and/or substrate therefore means and is also referred to herein as the number of cycles of dye liquor relative to substrate. Furthermore, the expression "rate of bath exhaustion as a function of the number of cycles of dye liquor and/or substrate" will hereinafter be referred to as the factor "D".

As a consequence of shrinking or swelling of the substrate, of the substrate reaching the glass transition point, of change in viscosity in the dye liquor and/or of other factors, it has been found that the number of cycles of the dye liquor and/or substrate will in general constantly change in the production dyeing process and therefore a direct relationship between bath exhaustion and time of dyeing is not in practice observed. However, it has been determined that the rate of adsorption of dye onto the substrate is directly related to the factor D and further, that maintaining the value of D throughout the dyeing process below a limiting value will result in acceptably level dyeings.

The control parameters of the dye bath that affect the rate of adsorption of dye onto the substrate and thus directly affect the value of the factor D, which are regulated in accordance with the process of the invention are both physical parameters, for example, temperature of the dye bath, the speed of circulation of the dye liquor and/or the frequency of immersion of the substrate, and the addition of further dye to the dye liquor, and chemical parameters, for example, pH of the dye liquor and chemical dye retarding or accelerating agents.

It is to be understood that the value of D may be controlled by regulating more than one of the control parameters, for example, by regulating two or three of the control parameters temperature, pH and the addition of chemical agents. Thus, for example, temperature is increased as rapidly as possible to the dyeing temperature and thereafter as necessary, e.g. from 20° to 120° C., preferably between 20° and 70° C. simultaneously ensuring that the D value remains below the limiting value, and when the dye liquor is approaching exhaustion, the pH is changed by adding an acid or base as the case may be, to maintain D below the limiting value. If, however, the heating capacity of the dyeing apparatus is low, other combinations of control parameters will be appropriate.

In one form of the process, for example, pH is regulated by the addition of an acidifier such as a lactone, imide or ester, which continuously generates acid in situ, in combination with temperature regulation, e.g. between 40° and 150° C., preferably between 70° and 150° C., particularly at the stage when the dye liquor is approaching exhaustion.

In general, the following regulations of control parameters are preferable, viz:

(a) regulating temperature as a function of D to maintain D below the limiting value while keeping all other control parameters constant.

(b) regulating pH or concentration of chemical adsorption accelerators, e.g. by addition of a lactone, imide or ester as acidifier, as a function of D to maintain D below the limiting value or (c) a combination of (a) and (b).

It is to be noted, however, that if necessary, control parameters apart from temperature, pH and chemical agents, can be called upon such as direct regulation of the number of cycles of, e.g. dye liquor, by regulating the bath flow pump or alternatively by increasing the value of the limiting value of D, e.g. by regularly reversing the direction of liquor flow as will be further described below.

It will be appreciated, however, that in some cases, the control parameters will be dictated by the nature of the dye and/or substrate. For example, the control parameter pH is generally appropriate only in the case of ionic dyestuffs, e.g. in the case of an anionic dyestuff and not, in general, appropriate to disperse dyestuffs.

The limiting value of D is dependent on the acceptable limit of unlevelness of the dyed substrate and is therefore determined experimentally. Thus, for example, a series of dyeing processes may be effected, the factor D being monitored throughout and appropriate changes in control parameters such as temperature being effected to maintain D approximately constant. On the basis of a series of different processes, each process being steered along a different constant D pathway, and on the levelness of the resulting dye substrate, either the limiting D value may be determined whereby D values over the determined limiting D value will result in unlevel dyeings or an acceptable D value level may be determined with a value below the limiting value.

One way of determining the regulation of the control parameters to maintain the value of D constant is to run a test process such that a control parameter is varied linearly as a function of the number of cycles of dye liquor and/or substrate and simultaneously monitoring the bath exhaustion. A relationship is thus obtained between, on the one hand, linear change in the control parameter as a function of the number of cycles of dye liquor and/or substrate and, on the other hand, the resulting variation of the D value, and therefrom the correction in the control parameter change as a function of the number of cycles of dye liquor and/or substrate may be computed by known methods, to determine a template of the variation of the control parameter as a function of the number of cycles of dye liquor and/or substrate necessary to obtain a constant D value. Having determined the necessary variation in the control parameter the process is rerun varying the control parameter as a function of the number of cycles of dye liquor and/or substrate in accordance with the predetermined template and the levelness of the resulting dyeing scrutinized. This procedure is repeated until the limiting D value is determined, i.e. which results in the limiting standard of levelness in the resulting dyeing, or until an acceptable value below the limiting value is determined.

It is to be noted that the resulting control parameter template corresponding to an acceptable D value may be employed as a program in the eventual production process as will be described in more detail below.

On the basis of repeated trials, it has been determined that the limiting D value is largely independent of the actual dye and the chemical nature of the substrate, and is largely dependent on the physical nature of the substrate.

Thus, in general, it has been found that the acceptable D limit for exhaust dyeing of a substrate is in the range of 0.2 to 20%, more specifically in the range of 0.5 to 6% of the initial dye concentration of the bath.

In particular, it has been found that for yarns and knitted goods, the D limit is in the range of 0.5 to 1%, for tops 1.5 to 2.5% and for flock 2.0 to 3.0%, based on the initial dye concentration in the dye bath. Within the above mentioned ranges, the D limit is largely independent of the type of textile fibre in most cases. However, as levelness requirements vary, for example, levelness requirements for flock dyeing are less stringent than in the case of yarn dyeing where, for example, the material is to be used to produce single coloured articles, it will accordingly be appreciated that acceptable D limits will vary within the above mentioned ranges.

It has further been found that the D limit may in general be increased under the influence of certain chemical or physical conditions. Thus, it has been found that regularly changing, particularly reversing, the direction of dye liquor flow will in general increase the D limit without impairing the levelness of dyeing obtained. As an optimum flow change condition, it has been found that one reversal of the direction of flow per unit circulation of the dye liquor produces an optimal increase in the D limit and, indeed, it has been found that the D limit may be increased in this manner by up to a factor of 4.

In addition, it has been found that the use of certain chemical agents in the dye liquor may also increase the D limit. These agents are chemicals that operate by inducing a high rate of dyestuff movement and quite generally, although not necessarily, are chemicals also known and used as leveling agents. Examples of such chemical agents are Lyogen DFT (for disperse dyeing)
Sandogen PES (for disperse dyeing)
Sandogen NH (for acid dyeing) "Sandogen" and "Lyogen" are registered trademarks of Sandoz, Inc.

It has been found that by addition of chemical agents to the bath, the D limit may be increased by up to a factor of 2.

When the dye liquor employed in the process of the present invention contains a plurality of dyes which are not adsorbed onto the substrate at the same rate, a situation which is particularly pronounced when the dyes are of different chemical classes, then the dye with the fastest rate of adsorption will be monitored in order to determine the D limit of the dye liquor as the basis of regulating the control parameters. In such cases, a bath exhaustion monitoring means should be employed that is selective for the dye with the fastest rate of adsorption, conveniently a colorimetric monitoring device, the colorimetric monitoring device being adjusted to be receptive to certain bands of the spectrum characteristic of the dye under observation.

As will be appreciated, the value of D throughout a dyeing process may be determined in known manner employing conventional equipment. Thus, the number of cycles of dye liquor and/or substrate may be measured by conventional equipment, e.g. a flow meter and/or, as the case may be, a counting device, as a function of dyeing time. The rate of bath exhaustion as a function of time may also be determined in conventional manner, e.g. manually, by removing samples of dye liquor for chemical analysis as a function of time or by employing an automatically operated device, e.g. a colorimetric device continuously measuring dye exhaustion as a function of time. On the basis of the results obtained, a direct relationship between dye exhaustion and the number of cycles of dye liquor and/or substrate may be obtained and the values of factor D over the complete dyeing process may be determined.

In addition, and as will be apparent from the description above, it is not necessary, although desirable to monitor D values directly, i.e. in the production dyeing process, since a D value template may be established indirectly in a test dyeing apparatus in respect of the values of D to be expected in a subsequent production dyeing process and therefrom the control parameters and their regulation necessary to reliably steer the process along a D pathway below the limiting value of D may be determined.

Thus, the steering of the process by regulation of at least one of the control parameters effecting the rate of adsorption of dye onto the substrate in order to maintain D below the limiting value throughout the complete dyeing process may be effected in accordance with a number of process steering systems.

For example, in a first process steering system, a test run is effected employing the substrate, and preferably also the dye, eventually intended to be employed in the production process. The test is effected by regulating at least one of the control parameters, i.e. the parameters that control the rate of adsorption of the dye onto the substrate, for example, bath temperature or pH, as a linear function of the number of cycles of the dye liquor and/or substrate, while maintaining other control parameters constant, and monitoring simultaneously bath exhaustion throughout the dyeing process. In this manner, the variation in D with linear increase in the control parameter(s) as a function of the number of cycles of dye liquor and/or substrate, is obtained, and therefrom, the variation of the control parameter(s), and hence the control parameter template(s), necessary to achieve a value of D below the limiting value may be computed. In this manner, the D value in the production process is monitored indirectly, i.e. predetermined, and the necessary regulation of the control parameter(s) as a function of the number of cycles of dye liquor and/or substrate is also predetermined. Thus, the production process is effected employing the same substrate, and preferably dye, and monitoring the number of cycles of dye liquor and/or substrate, the predetermined necessary regulation of the control parameter(s) as a function of the monitored number of cycles of the dye liquor and/or substrate being applied, all other control parameters being maintained constant. In this manner a reliable and reproducible production dyeing process may be effected with satisfactory dyeings and which, since being sensitive to the behaviour of the actual production process, may be operated at a predetermined D limit approximating closely to the D maximum limit for level dyeing.

In one form of the above described first process steering system, the results from the test run are analysed by a data processing unit, to determine the relationship between the control parameter(s), and the corresponding D values as a function of the number of cycles of dye liquor and/or substrate. The data processing unit is also pre-programmed with the limiting value of D and also with a correction system to compute, on the basis of the incoming monitored information, the regulation of the control parameter(s) as a function of the number of cycles of dye liquor and/or substrate, necessary to steer the value of D along a course below the limiting value of D throughout the subsequent production process. The computed data is then recorded and the record serves as a program for the subsequent production process.

Alternatively, and preferably, a program for the subsequent production process is determined from the data obtained in predetermining the limiting value or acceptable value of D as hereinbefore described, i.e. a control program producting a constant D value in the process.

The programs obtained may be employed in a data processing unit associated with the production dyeing apparatus to regulate the control parameter(s) of the production process as a function of the monitored number of cycles of dye liquor and/or substrate.

As will be appreciated, a series of programmed records developed on the basis of test runs as described above, for different substrates, preferably also in combination with different dyestuffs, may be obtained to establish a fully automated production dyeing method for a variety of substrates and dyes.

In a second process steering system, D is directly monitored during and throughout the production process and at least one of the control parameters regulated to maintain the value of D below the limiting value.

In a preferred form of the second system, the monitored D value information is fed into a data processing unit associated with the production dyeing apparatus with an output to at least one control parameter regulator of the dye bath. The data processing unit is preprogrammed with a predetermined maximum limit of D below the limiting value of D and with one or more primary control responses, if necessary with a master sequence of priorities for each of the primary control responses. Thus, on registering monitored data indicating that the D preprogrammed limit is being approached, one or a combination of the programmed primary control responses are triggered thus regulating the control parameter(s) accordingly. It will be appreciated that the system has an inbuilt feed back system so that the effect of the triggered primary responses is also registered by the data processing unit. If, for example, insufficient regulation is provided by the primary control response system, then either the primary control responses can be retriggered or the data processing unit can be preprogrammed with one or more secondary control responses which are activated on failure of the primary response system to achieve sufficient reduction of the D value. In this preferred form, the second process steering system is not only completely automatic subject to the pre-programming of the data processing unit with a predetermined D limit, but is extremely sensitive to the individual behaviour of any production process so that the process may be reliably steered along a D pathway which is extremely close to the limiting value, especially if the data processing unit is pre-programmed with a D minimum value together with the necessary primary and if desired, secondary control responses to maintain D above said minimum value so that optimum efficiency with regard to dyeing duration and operating conditions may be achieved.

By "programmed record" as employed herein is meant any of the conventional media for recording data programs, for example, punched cards, punched tapes magnetic tapes, magnetic discs or magnetic drums.

In general, the process of the invention may by employed with all known exhaust dyeing apparatus which operate on excess liquor principles. Examples are cheese and cone dyeing machines, beam dyeing machines, jigs, winch becks, paddle dyeing machines, packing apparatuses, jet dyeing machines, rotary dyeing machines, hank dyeing machines and high liquor ratio dyeing machines such as are known in the trade under the name "Fluid-o-Therm."

With two or more dyeing machines arranged in tandem operating by circulating dye liquor, the circulation speed may be related to the total liquor volume of both dyeing machines and bath exhaustion may be measured at both the input and the output side of the whole assembly.

The process of the invention is in general suitable for all kinds of substrate, e.g. textiles such as textile fibre materials consisting of cotton, wool or silk, or synthetic yarns or fibres of polymerisates of polyethylene, polyisobutylene, propathene, PVC, polyvinyl acetate, polyvinyl alcohol, polyvinyl ether or polyacrylonitrile, polyurethanes, polyamides (nylons, for example, lactams such as caprolactam, or polymethylene diamines and dicarboxylic acids such as nylon 6, nylon 66 and nylon 610), polyesters as well as semi-synthetic materials such as cellulose acetates or regenerated cellulose. All of these textiles as well as blends thereof are dyeable according to the process of the invention.

It is convenient if the dyes are matched to the textiles to be treated. Where, for example, natural or synthetic polyamide or basic modified fibres are to by dyed, a water-soluble anion-active dye such as a so-called wool dye is conveniently employed. Such dyes may belong to the class of monoazo dyes, diazo dyes, anthraquinone dyes, phthalocyanine metal dyes (such as copper or nickel phthalocyanine), triaryl methane dyes, xanthene dyes, nitro dyes, dioxazine dyes, "metallized" i.e. metal complex dyes, e.g. 1:1 chrome, 1:2 cobalt or 1:2 chrome-complex series of metal complex dyestuffs, "metallizable", e.g. chromatizable dyes, direct dyes having an affinity for wool and/or nylon in neutral to acid baths of fibre-reactive dyes such as those containing a 2,4-dichloro-pyrimide-5-yl, 2,4-dichloro-1,3,5-triazine-6-yl or acryloyl group.

For the dyeing of cotton (and other cellulose fibre) azo dyes, basic dyes, direct dyes, mordant dyes, reactive dyes, sulphur and vat dyes may be employed.

Hydrophobic fibres such as polyolefine fibres, polyvinyl fibres and straight-chain aromatic polyester fibres are dyed preferably employing disperse dyes, e.g. of the monoazo, diazo, anthraquinone, nitro, styryl or quinophthalone series.

As is known, basic dyes are used in particular for the dyeing of acrylonitrile polymers and copolymers. Basic dyes suitable for this purpose are, for example, the equally known nitro, styryl, methine, polymethine, anthraquinone, quinophthalone, azomethine or azo dyes.

When different types of fibres are dyed according to the process of the invention either a single liquor containing a dye for each fibre type or several liquors each containing one dye for one type of fibre may be employed. For the dyeing of a polyester/cotton blend for example, a single liquor may be used containing both a disperse and a reactive dye, or alternatively the blend may also be dyed with two liquors each containing one dye for the fibre types. For treatment with optical brightening agents, any conventional colourless stilbene dye, either alone or in a mixture with other suitable dyes, may be employed.

The dye liquors employed in the process of the invention may be produced from organic solvents which are optionally mixed with water. Such solvents may in principle comprise any of the known solvents used in dyeing processes.

After the dye has been sufficiently adsorbed onto the substrate, the dye may, if desired, be fixed onto the substrate in conventional manner, e.g. by heating to between 100° and 160° C.

Several specific embodiments of the invention are described below, by way of example, with reference to the accompanying drawings wherein:

FIGS. 9 to 13 are graphic representations of the temperature regulation programs employed in further specific modes of production operation of the apparatus form of FIG. 1.

Figure 1:
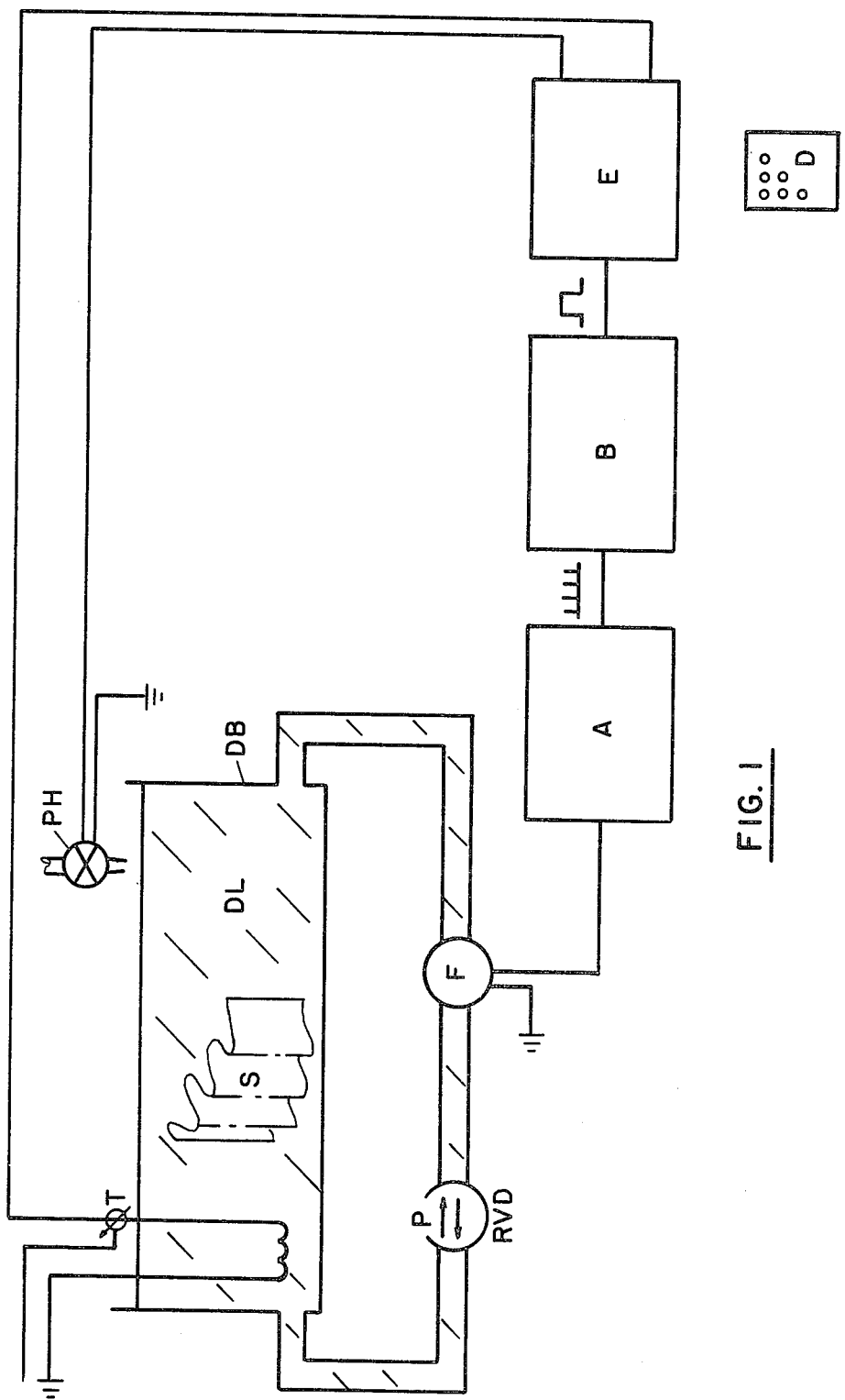
FIG. 1 is a schematic representation of the layout of one form of automated exhaust-dyeing apparatus.

In the embodiment shown in FIG. 1, an exhaust dyeing apparatus comprises a dye machine of conventional type, e.g. a cheese and cone dyeing machine, having a dye bath DB and provided with a reversible variable delivery (RVD) pump P. The bath is further provided with a temperature regulator T, a pH regulator PH and a flow meter F for monitoring the flow of dye liquor. The flow meter F is in the form of a transducer and operates on the principle of electro-magnetic conversion to generate an electrical signal at an output thereof which is proportional to the dye liquor flow. The flow meter F is coupled to a data processing unit comprising in series a current frequency converter A, a frequency reducer B and a control unit E charged with a programmed record D in the form of a punched card. The data processng unit is provided with outputs to the temperature and pH regulators T and PH respectively.

In operation of the form of dyeing apparatus shown in FIG. 1, the dye bath DB is charged with dye liquor DL and substrate S and the temperature regulator preset to achieve the dyeing temperature of the bath as quickly as possible. Thereafter the operation of the dyeing apparatus proceeds automatically. Thus, the flow meter F continuously and automatically monitors the flow rate, feeding a corresponding signal to the data processing unit. After the signal has been converted to manageable form by the current frequency converter A and the frequency reducer B, it is fed into the control unit E progressively indexing new combinations of programmed data thereby controlling the regulation of the temperature regulator T and if necessary the pH regulator PH. In this manner, the dyeing process, steered by the data processing unit, proceeds along a course wherein the value of D is restricted below the limiting value.

In a modification of the above described procedure, the reversible variable delivery pump P is coupled to the flow meter to effect reversal of flow once per complete circulation of the complete bath dye liquor volume, thereby increasing the acceptable D limit.

Figure 4:
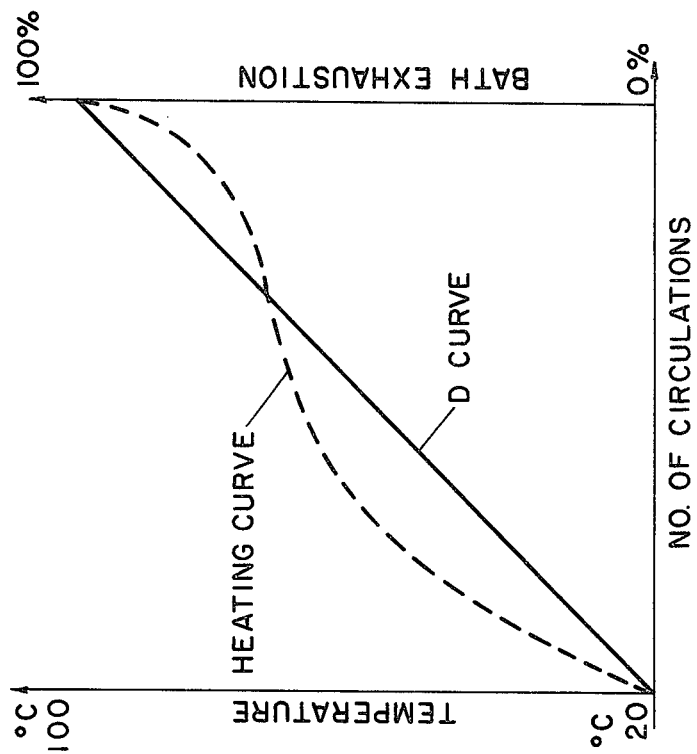
FIG. 4 is a graphic representation of a temperature regulation program suitable in production operation of the apparatus form of FIG. 1.
Figure 3:
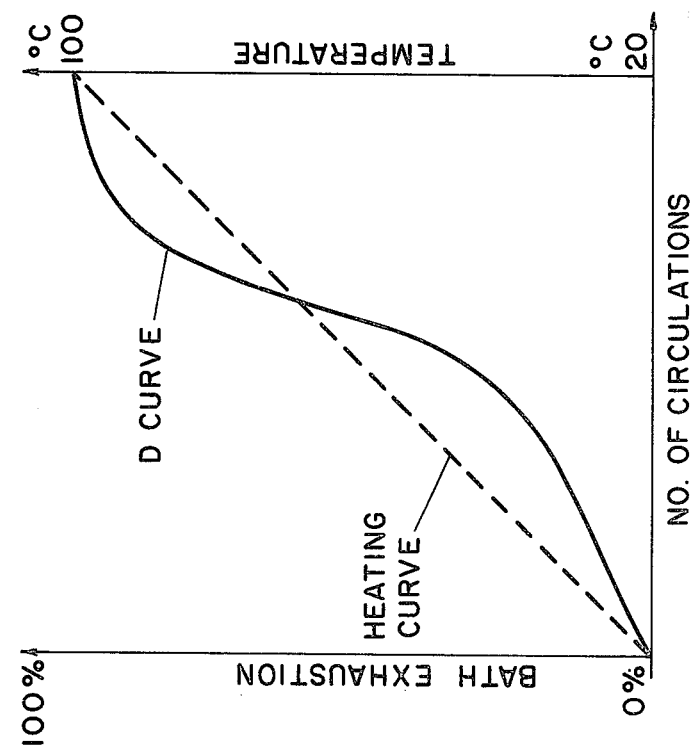
FIG. 3 is a graphic representation of the variation of bath exhaustion with linear temperature variation as a function of the number of cycles of dye-liquor in a test run with the apparatus form of FIG. 1.

The D limit and the control parameter program employed in the above described operation may be simultaneously predetermined experimentally in accordance with the following procedures viz:

A test run is effected varying temperature linearly as a function of the number of cycles of dye liquor and simultaneously monitoring and recording the rate of bath exhaustion, again as a function of the dye liquor flow rate. A relationship will thus be obtained as between variation of bath exhaustion with linear change in temperature as a function of the number of cycles as shown graphically in FIG. 3. A computation is then effected so as to obtain the relationship between regulation of temperature to obtain linear change in bath exhaustion, as a function of the number of cycles as shown graphically in FIG. 4. The test is re-run regulating the temperature in accordance with the computed temperature regulation as a function of the number of cycles, and the resulting dyeing scrutinised for levelness of dyeing. The procedure is repeated several times employing different linear temperature gradients in each first run and in this way an acceptable D value may be determined. Moreover, the predetermined temperature regulation as a function of the number of cycles necessary to obtain an acceptable and constant D value (e.g. as shown in FIG. 4) may be employed as a temperature control program in the production process described above. In order to determine a pH program, the portion of the temperature program wherein undesirably high temperatures are required may be redetermined with reference to pH variation in analogous manner to the temperature variation procedure described above, so that a temperature/pH program is obtained.

Figure 2:
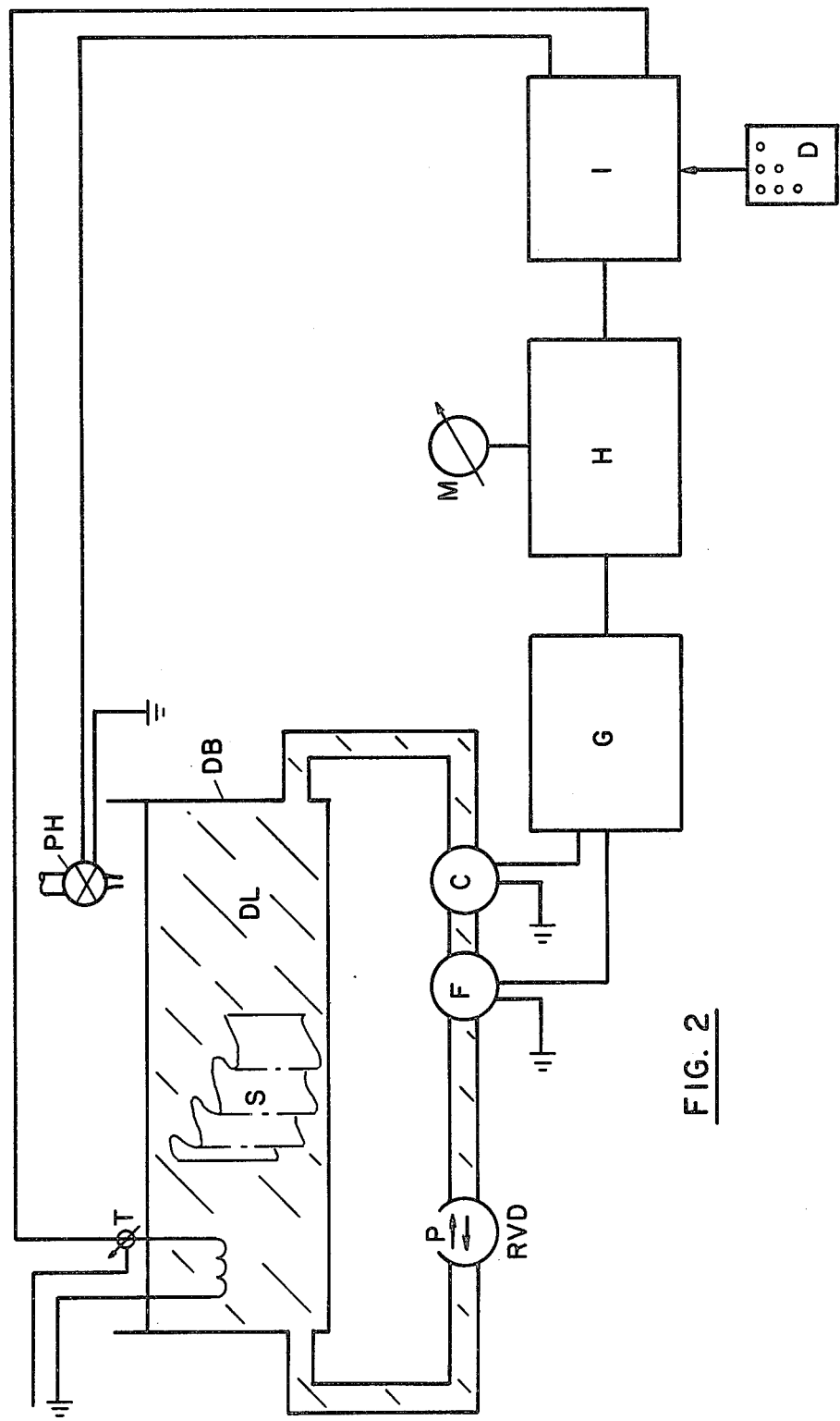
FIG. 2 is a schematic representation of the layout of a further form of automated exhaust-dye apparatus.

In the embodiment shown in FIG. 2, an exhaust dyeing apparatus comprises a dye machine of conventional type, e.g. a cheese and cone dyeing machine, and in many respects the apparatus is analogous to that shown in FIG. 1. The same reference letters are therefore employed for analogous integers. The embodiment shown in FIG. 2 is characterised by a bath exhaustion monitoring means in the form of a colorimetric device C which, together with the flow meter F has an output to the data processing unit. The data processing unit comprises in series a division logic G to compute the value of the factor D on the basis of the signal inputs from the flow meter F and colorimetric device C, a comparator H which compares the monitored value of the factor D computed in the division logic with a predetermined limit, the predetermined limit being manually set on the manual setting device M, and provides an error signal which is related to the difference between the actual value of factor D and the predetermined limit, and a control means I which is programmed with a program record, e.g. in the form of a punched card D, bearing a series of primary responses, governed by a set sequence and which can be triggered off in the set sequence by error signals below a set value, from the comparator H. The outputs of the data processing unit are connected to the temperature and pH regulators I and PH.

In operation of the form of dyeing apparatus shown in FIG. 2, the dye bath DB is charged with dye liquor DL and substrate S and the temperature regulator preset to achieve the dyeing temperature of the bath as quickly as possible. Thereafter the operation of the dyeing apparatus proceeds automatically. Thus, the flow-meter F and the colorimetric device C continuously monitor the flow rate and bath exhaust rate respectively and each converts the measured data into a signal which is fed to the division logic G of the data processing unit. The division logic converts both signals to a unitary signal representative of the D value of the bath. The resulting D signal is fed into the comparator H and an error signal is computed representative of the difference between the monitored D value signal and the predetermined D value limit. The error signal is then fed into the control means I of the data processing unit which is preprogrammed with the punched card D bearing the primary responses and sequence of response. Dependent on the error signal, the primary responses are triggered in the preprogrammed sequence when the D value of the bath approaches the predetermined limit and control signals are thus transmitted from the data processing system to the temperature and pH regulators T and PH. The apparatus thus operates continuously and in this manner serves to maintain the D value of the bath below the limiting value.

In a modification of the above apparatus, the control means I comprises simply an amplifier with an output to only one of the control parameter regulators, e.g. the temperature regulator T, the amplified signal from the control means constituting the regulated power source for, e.g. the bath heater. In this modification therefore, the programming of the control means corresponds to the selection of the amplification factor of the amplifier, which may be either fixed or variable.

The predetermined limit of D may be determined by the procedure described above in relation to the first embodiment.

The following are examples of specific modes of operating the apparatus form of FIG. 1 in production dyeings.

FIRST SPECIFIC MODE OF OPERATION

Figure 5:
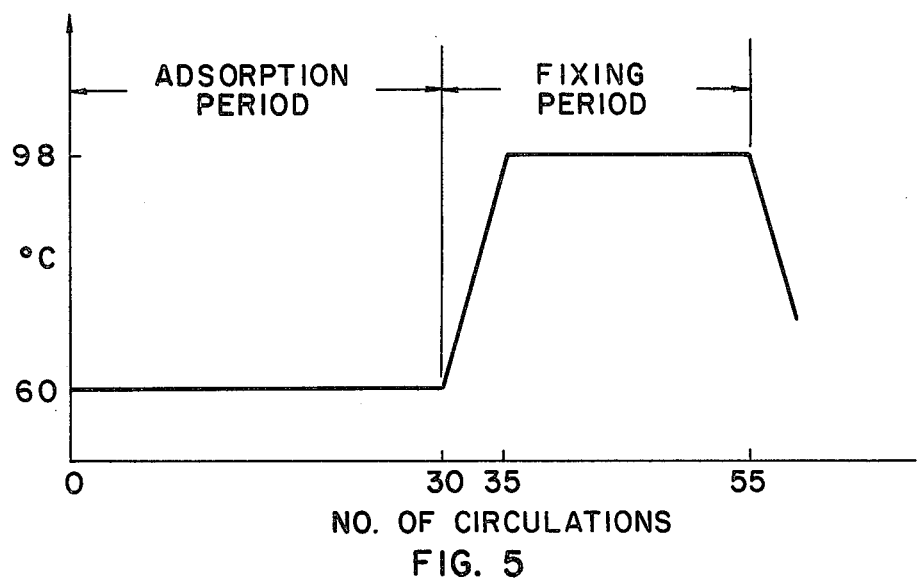
FIG. 5 is a graphic representation of the temperature variation in a first specific mode of production operation of the apparatus form of FIG. 1.

On a cheese and cone dyeing machine 100 parts polyamide 6,6 textured in muff form are dyed in 1000 parts aqueous dye liquor containing 2 parts C.I. dye acid blue 280, according to the temperature/circulation programme of FIG. 5.

Figure 6:
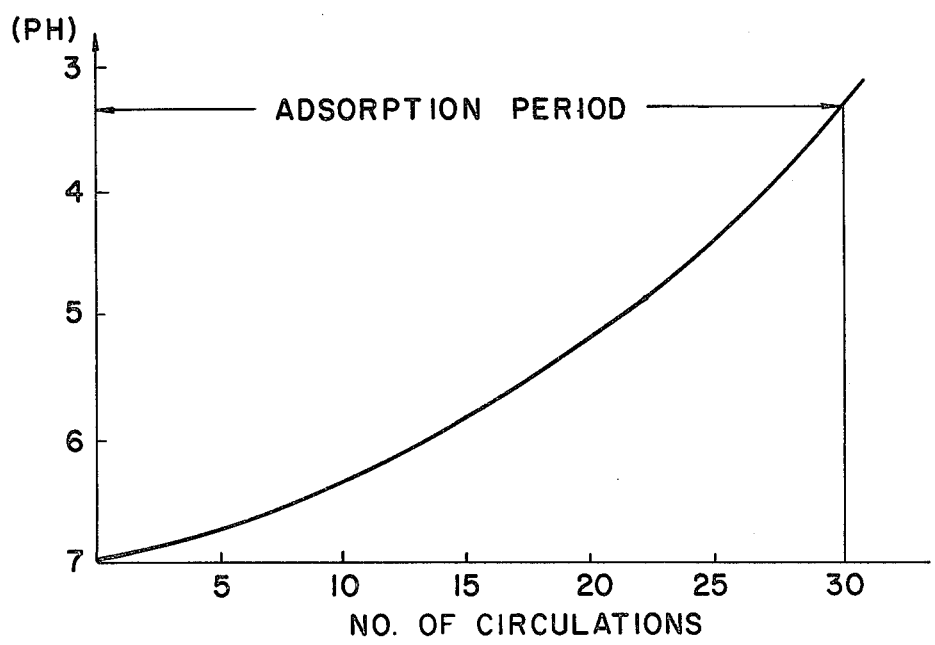
FIG. 6 is a graphic representation of a pH regulation program employed in the first specific mode of production operation of the apparatus form of FIG. 1.

During the period of dye absorption the pH value of the dye bath is adjusted with acetic acid and formic acid according to the pH/circulation programme of FIG. 6.

Throughout the process one reversal of liquor flow takes place per bath circulation.

With this procedure employing a constant bath exhaustion/circulation of 3.3% a level fast blue dyeing was obtained.

SECOND SPECIFIC MODE OF OPERATION

On a beam dyeing apparatus, 100 parts polyamide 6,6 knit goods are dyed in 1000 parts aqueous dye liquor containing 2 parts of an oxyethylated fatty amine and 2 parts C.I. dye acid blue 280.

Figure 7:
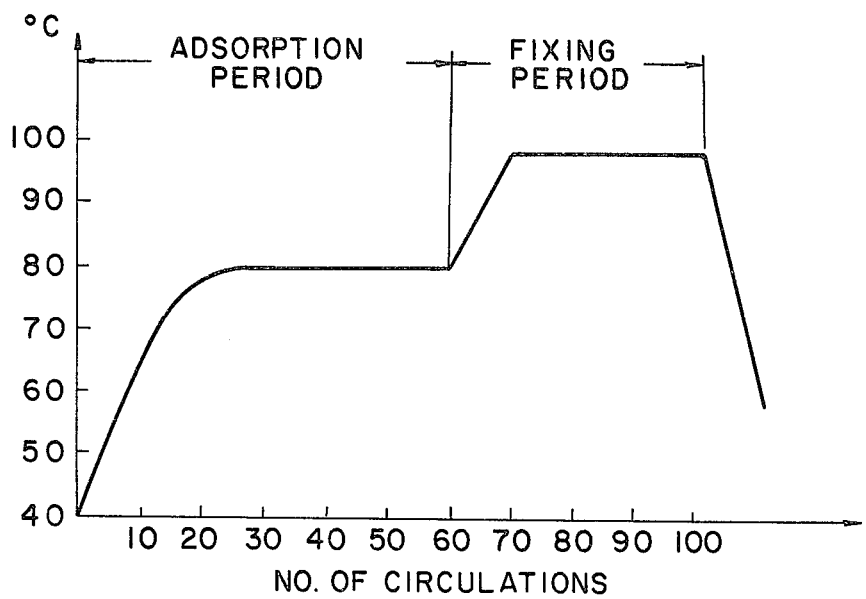
FIGS. 7 and 8 are graphic representations of temperature and pH regulation programs employed in a second specific mode of production operation of the apparatus form of FIG. 1.
Figure 8:
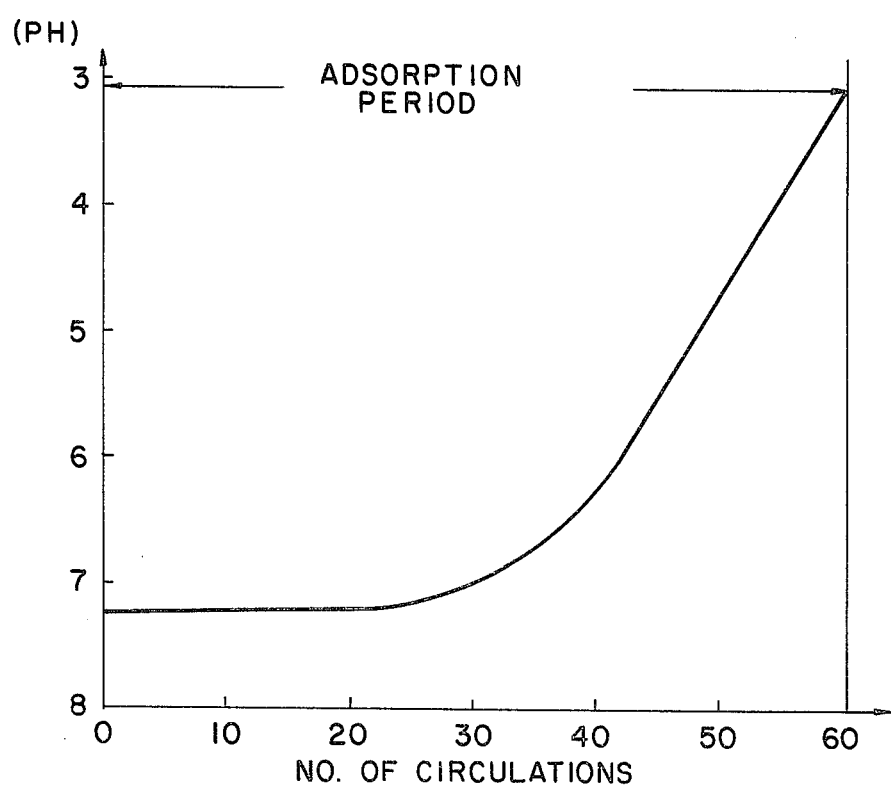

Temperature and pH value are controlled simultaneously according to the programme shown in FIGS. 7 and 8. With this procedure employing a constant bath exhaustion/circulation of 1.7% a level fast blue dyeing was obtained.

THIRD SPECIFIC MODE OF OPERATION

On a HT cheese and cone dyeing machine, 100 parts polyamide 6,6 yarn are dyed in 1500 parts perchloroethylene, 30 parts water, 0.5 parts glacial acetic acid, 5 parts of 1:1 mixture of calcium dodecylsulphonate and isooctylphenyl glycol ether, 2 parts stearic acid polyglyceride (commercially available) and 0.8 parts of C.I. dye acid blue 280, according to the temperature/circulation programme shown in FIG. 9. The procedure results in a linear exhaustion of about 1% per circulation. A level fast blue dyeing is obtained.

FOURTH SPECIFIC MODE OF OPERATION

100 Parts wool in rope form are dyed in 2500 parts of an aqueous dye liquor on a COLORHANK hank dyeing machine (Bellmann, Haagen) at a liquor circulation of 8 times/minute. The liquor is of the following composition: 3.6 parts of a dye of formula:

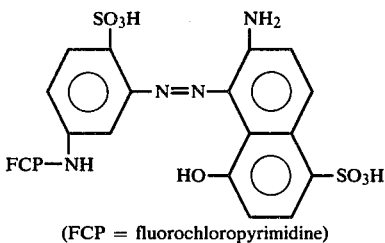

(FCP = fluorochloropyrimidine)

1 part of an addition compound of aminopropyl stearic amine, 15 mols propylene oxide, 20 mols ethylene oxide 20 mols ethylene oxide and 1 mol amidosulphonic acid (commercially available) and 1.5 parts acetic acid (50%). The final pH value of the liquor is 4.8. The yarn is dyed according to the temperature/circulation programme shown in FIG. 10 and a level brilliant red dyeing is obtained. A constant bath exhaustion/circulation of 0.9% is achieved.

FIFTH SPECIFIC MODE OF OPERATION

Figure 11:
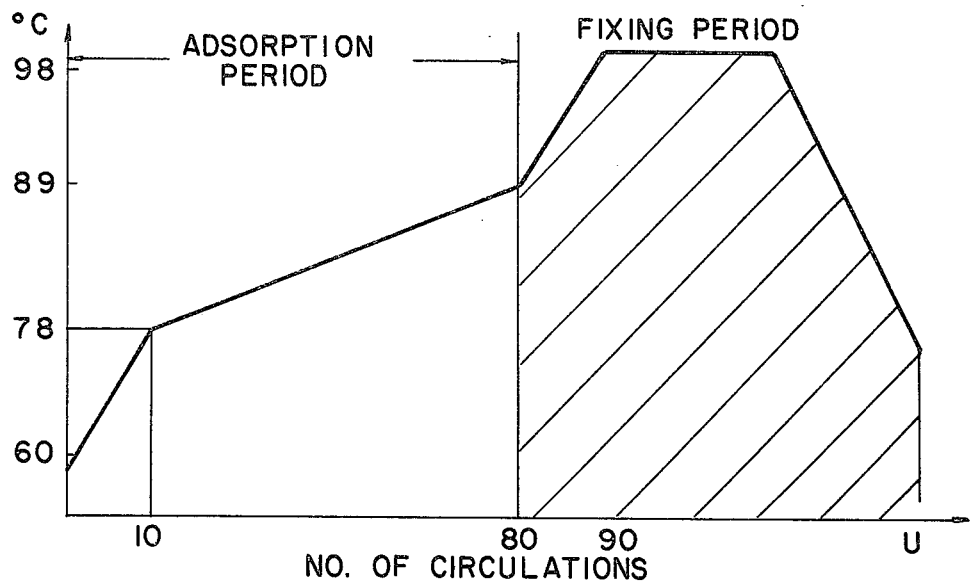

On a cheese and cone dyeing machine, 100 parts of a commercially available polyacetate yarn (sold under the Trade name "Courtelle") is dyed with 1200 parts of an aqueous dye liquor containing 1 part of the dye 2-(4'-N-ethyl-N-β-hydroxy ethyl amino phenylazo)-6-methoxy-benzthiazol, quaternized with methyl chloride and 1.5 parts sodium acetic acid. The pH value of the liquor is 4.5. The yarn is dyed according to the temperature/circulation programme shown in FIG. 11. The dyeing obtained is level at a constant bath exhaustion/circulation of 1.2%.

SIXTH SPECIFIC MODE OF OPERATION

On an HT beam dyeing apparatus, 100 parts polyamide 6,6 knit goods are dyed in 1000 parts of an aqueous dye liquor containing an addition compound of 2 parts aminopropyl fatty amine and 100 mols ethylene oxide (commercially available) and 1.3 parts of a dye of formula:

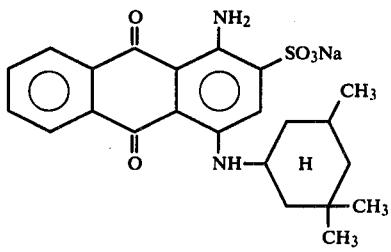

Figure 12:
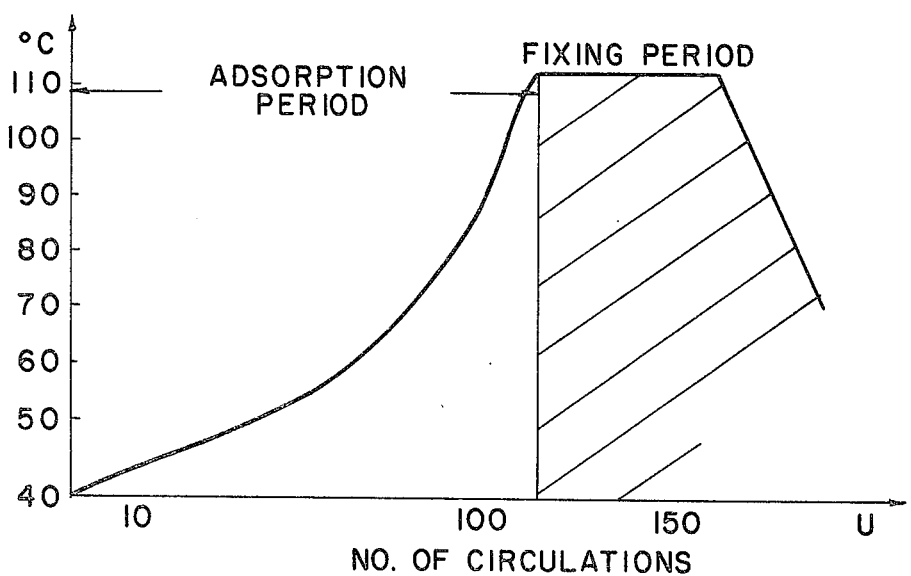

The pH value is buffered at 6 with commercially available disodium phosphate. The temperature/circulation programme is illustrated in FIG. 12. A level fast blue dyeing is obtained at a linear constant bath exhaustion/circulation of 1%.

SEVENTH SPECIFIC MODE OF OPERATION

On an HT cheese and cone dyeing machine, 100 parts of a commercially available polyester textile material (textured) are dyed in 800 parts of an aqueous dye liquor containing 1.1 parts of a dye of formula:

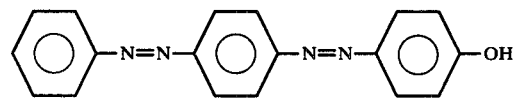

Figure 13:
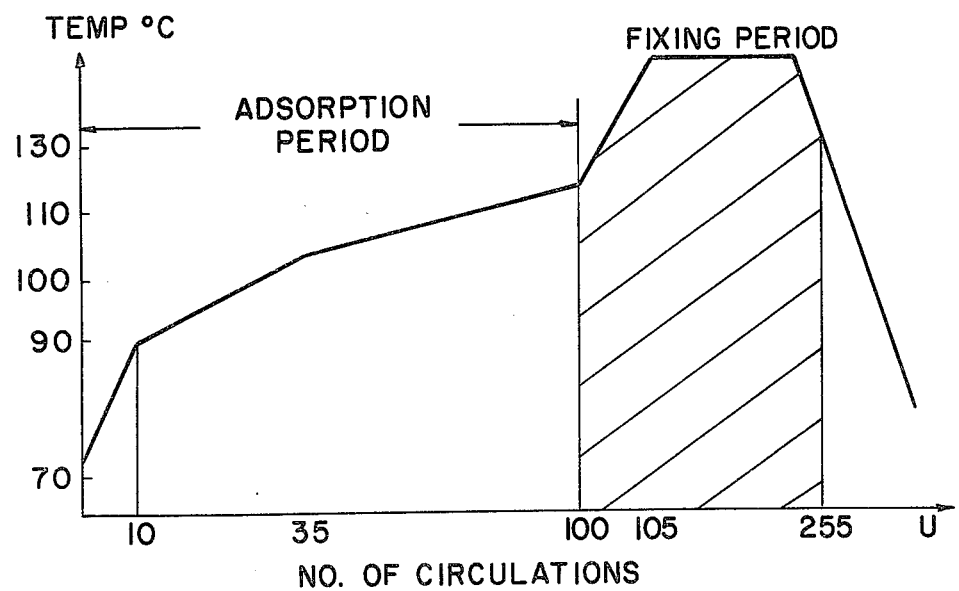

1 part of a high-sulphonated fatty sulphonate (commercially available) and 1.6 parts ammonium sulphonate. The pH value is adjusted to 5.5 with formic acid. The temperature/circulation programme shown in FIG. 13 is employed. The dyeing obtained is fast and level at a bath exhaustion/circulation of 1%.

What is claimed is:

1. In an apparatus adapted for use in an exhaust dyeing process wherein a dye liquor is caused to flow relatively past a substrate to be dyed, said apparatus comprising (1) regulating means for regulating a parameter which controls the amount of dye per interval which is adsorbed from a dye liquor onto a substrate, (2) measuring means for measuring the number of intervals and putting out a signal relative thereto, and (3) data processing means programmable with a program of the necessary variation of said parameter as a function of the number of said intervals to obtain a desired amount of dye adsorption per interval, said data processing means having input means for receiving said signal from said measuring means and output means to said regulating means, the improvement wherein said measuring means comprises means for measuring the number of cycles of dye liquor relative to the substrate.

2. An apparatus according to claim 1 wherein the measuring means comprises a flowmeter adapted to measure the circulation of the dye liquor or a counting device adapted to measure the number of immersions of the substrate in the dye liquor.

3. An apparatus according to claim 2 in combination with a dyebath.

4. An apparatus according to claim 2 wherein the regulating means comprises heater means for adjusting the temperature, valve means for adjusting the pH or chemical content of the dye liquor or pump means for adjusting the speed of circulation of the liquor.

5. An apparatus according to claim 2 which includes colorimeter means for monitoring the amount of dye adsorbed from a dye liquor, said colorimeter means having input to said data processing means, and wherein said data processing means is adapted to compute the rate of adsorption of a dye from a dye liquor as a function of the number of cycles of said dye liquor, compare the computed rate with a predetermined limiting rate and put out a signal to the regulating means based on the difference between the computed and predetermined rates.

6. An apparatus according to claim 2 including the data processing program of the predetermined limiting rate of dye adsorption as a function of the number of cycles of dye liquor relative to substrate and the variation in adsorption-controlling parameter to maintain the actual rate of dye adsorption at or below said limiting rate.

7. An apparatus according to claim 6 wherein the program is in the form of a punched card, punched tape, magnetic tape, magnetic disk or magnetic drum.

8. An apparatus according to claim 2 wherein the measuring means is a flowmeter and the apparatus includes a current/frequency converter and a frequency reducer to convert the flowmeter current to a signal suitable for the data processing means.

* * * * *

UNITED STATES PATENT AND TRADEMARK OFFICE
CERTIFICATE OF CORRECTION

PATENT NO. : 4,199,813
DATED : April 22, 1980
INVENTOR(S) : JOSE CARBONELL/ROLF HASLER/ROLAND WALLISER It is certified that error appears in the above—identified patent and that said Letters Patent is hereby corrected as shown below:

Page 1, insert

-- Foreign Application Priority Data

Dec. 15, 1972   Switzerland............18304/72

Apr. 13, 1973   Xwitzerland............ 5330/73 --.

Signed and Sealed this

Twenty-third Day of June 1981

[SEAL]

*Attest:*

RENE D. TEGTMEYER

*Attesting Officer*  *Acting Commissioner of Patents and Trademarks*